Patented Mar. 21, 1939

2,151,461

UNITED STATES PATENT OFFICE 2,151,461

PURIFICATION OF METHANOL

Edgar C. Britton and Ralph P. Perkins, Midland, Mich., assignors to The Dow Chemical Company, Midland, Mich., a corporation of Michigan No Drawing. Application July 28, 1937, Serial No. 156,176

5 Claims. (Cl. 202—57)

This invention relates to a process for the purification of crude methanol derived from the dry distillation of wood.

In any of the usual processes for recovering methanol from pyroligneous acid liquor by evaporation or distillation, the methanol is accompanied by a variety of low boiling materials which are for convenience termed the "methanol products". These materials are substantially all volatile at temperatures below about 65° C. Redistillation or fractionation of the methanol products yields a methanol fraction and a "methyl-acetone" fraction, each of which contains as impurities materials which are azeotropic with the principal product in each fraction.

The principal impurities in the crude methanol products which boil up to about 65° C. have been identified as acetals. These materials form constant boiling mixtures with methanol. For example, dimethyl acetal and methanol formed a constant boiling mixture at 56.4° C. Similarly, formaldehyde diethyl acetal and methanol form a constant boiling mixture having a boiling point of about 62.5° C. We have found that if the acetals are left in the methanol products during fractional distillation, it is very difficult if not actually impossible, to produce a pure methanol or a pure methyl-acetone from the mixture.

The presence of acetals in the methanol and methyl acetone of commerce is objectionable owing to the fact that in storage the acetals continuously decompose to form aldehydes, which in turn are oxidized to acids. Another characteristic of the aldehydes and acetals, when they are present as impurities in methanol or methyl-acetone, is their tendency to form colored products discoloring the same.

We have now discovered a process by which the acetals and similar materials forming constant boiling mixtures with methanol at temperatures below 65° C. can be conveniently removed therefrom in a relatively simple manner. The crude methanol products are diluted with an amount of water equivalent to from about 10 to about 75 per cent of the methanol present and the pH of the mixture is adjusted to about 3.0 to 4.0 by the addition of an appropriate amount of acid. We have found that, if this acidified mixture is rectified immediately, there is only a slight improvement in the quality of the methanol. If, however, the solution is brought to its boiling point and the material boiling between about 50 and about 65° C. refluxed for a period of from a few minutes to a few hours, the aldehydic compounds, such as formaldehyde, acetaldehyde and propionaldehyde, which are formed by hydrolysis of the corresponding acetals and are considerably lower boiling than the desired products, are continuously removed during the refluxing operation. After aldehyde formation and evolution has ceased, the remaining liquid product is then fractionally distilled into the methyl-acetone and the methanol fractions. When each of these fractions is treated during redistillation with an alkali, such as sodium hydroxide or sodium carbonate, sufficient in quantity to neutralize the acids present, a methyl-acetone product in the one case and methanol in the other is obtained in a high degree of purity.

The step of hydrolyzing the acetals referred to above proceeds most satisfactorily when the pH of the crude methanol has been adjusted to the range from about 3 to about 4, either by the addition of an organic acid, such as acetic acid, or of an inorganic acid, such as sulphuric acid. The presence of salts, such as sodium chloride, in the acid solution being subjected to hydrolysis accelerates the hydrolysis of the acetal. When the acid hydrolysis step is carried out as a refluxing operation, it is possible, by adjusting the temperature of the reflux condenser, to effect a continuous separation from the desired product of all materials boiling up to about 50° C. It is also possible to carry out this hydrolysis in closed equipment which would not permit of continuous vaporization of the aldehydic materials from the mixture. In such case we digest the acidified mixture at a temperature just below the normal atmospheric boiling point thereof for a period of from about 1 to about 3 hours, or more, thereafter cool the liquid to just below about 50° C., release the pressure thereon, evaporate therefrom the aldehydic materials, neutralize the mixture, and recover the purified methyl-acetone and purified methanol by fractional distillation.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The process which comprises forming an aqueous acidic solution of crude methanol derived from pyroligneous acid, heating the solution at a temperature between about 50° C. and about 65° C. for a sufficient period of time to hydrolyze the acetal impurities therein present, separating aldehydic materials therefrom, and fractionally distilling the mixture to separate substantially pure methanol.

2. The process which comprises forming an aqueous acidic solution of crude methanol derived from pyroligneous acid, refluxing the same at a temperature between about 50° C. and about 65° C. to hydrolyze the acetal impurities therein present, while continuously removing by vaporization the aldehydic materials produced by hydrolysis, neutralizing the mixture after substantially all of the aldehydic materials have been removed therefrom, and separating substantially pure methanol from the reaction product.

3. The process which comprises adjusting the pH of a crude aqueous methanol solution derived from pyroligneous acid to between about 3.0 and about 4.0, refluxing the acid methanol solution at a temperature between about 50° C. and about 65° C. as long as aldehydic materials are evolved therefrom, and thereafter distilling substantially pure methanol from the reaction product in contact with an alkaline material.

4. The process which comprises adjusting the pH of a solution of crude aqueous methanol derived from pyroligneous acid to between about 3.0 and about 4.0, subjecting the acid-methanol solution to a temperature equivalent to the atmospheric reflux temperature thereof for a period between about 1 and about 3 hours, removing aldehydic impurities therefrom, thereafter neutralizing the acid therein and distilling substantially pure methanol from the reaction product.

5. The process whch comprises forming an aqueous acidic solution of crude methanol derived from pyroligneous acid, heating the solution at a temperature between about 50° C. and about 65° C. for a sufficient period of time to hydrolyze the acetal impurities therein present, separating aldehydic materials therefrom, and neutralizing the solution.

EDGAR C. BRITTON.
RALPH P. PERKINS.